United States Patent
Posselt et al.

(10) Patent No.: US 10,622,871 B2
(45) Date of Patent: Apr. 14, 2020

(54) METHOD FOR MANUFACTURING A ROTOR FOR A SLIP RING MOTOR, ROTOR FOR A SLIP RING MOTOR AND SLIP RING MOTOR

(71) Applicants: Linde Aktiengesellschaft, Munich (DE); WEG Equipamentos Electricos S.A., Jaragua do Sul/SC (BR)

(72) Inventors: Heinz Posselt, Bad Aibling (DE); Marco Kleis, Raubling (DE); Gustavo Tadeu Omine, Jaraguá do Sul (BR); Thiago Vegini, Joinville (BR)

(73) Assignees: Linde Aktiengesellschaft, Munich (DE); WEG Equipamentos Electricos S.A., Jaragua do Sul/SC (BR)

( * ) Notice: Subject to any disclaimer, the term of this patent is extended or adjusted under 35 U.S.C. 154(b) by 484 days.

(21) Appl. No.: 15/364,387

(22) Filed: Nov. 30, 2016

(65) Prior Publication Data
US 2017/0331351 A1   Nov. 16, 2017

(30) Foreign Application Priority Data
Dec. 3, 2015   (DE) ......................... 10 2015 015 702

(51) Int. Cl.
*H02K 13/02* (2006.01)
*H02K 15/00* (2006.01)
*H02K 15/02* (2006.01)

(52) U.S. Cl.
CPC ............. *H02K 13/02* (2013.01); *H02K 15/00* (2013.01); *H02K 15/02* (2013.01); *Y10T 29/49012* (2015.01)

(58) Field of Classification Search
CPC ......... H02K 13/02; H02K 15/00; H02K 15/02
See application file for complete search history.

(56) References Cited

FOREIGN PATENT DOCUMENTS

DE           3248219 A1 *   7/1984   ............. H02K 13/02

* cited by examiner

*Primary Examiner* — Livius R. Cazan
(74) *Attorney, Agent, or Firm* — Millen White Zelano & Branigan, PC

(57) ABSTRACT

A method for manufacturing a rotor for a slip ring motor, including the steps of: a) arranging a plurality of electric cables inside a hollow shaft, wherein the electric cables are distributed over an inner circumference of the hollow shaft, b) filling a resin into an empty space defined between the hollow shaft and the electric cables, c) arranging a rod inside the hollow shaft thereby displacing the resin into an annular gap between the rod and the hollow shaft, wherein the electric cables are arranged in the annular gap, and d) curing of the resin to form the rotor.

19 Claims, 7 Drawing Sheets

METHOD FOR MANUFACTURING A ROTOR FOR A SLIP RING MOTOR, ROTOR FOR A SLIP RING MOTOR AND SLIP RING MOTOR

The present invention relates to a method for manufacturing a rotor for a slip ring motor, to a rotor for a slip ring motor and to a slip ring motor.

Air separation plants use large-size compressors to compress air. The compressors are driven by induction or asynchronous motors, typically with a power output of 12 to 18 megawatts (MW).

An induction or asynchronous motor is an AC (alternating current) electric motor in which the electric current in the rotor needed to produce torque is obtained by electromagnetic induction from the magnetic field of the stator winding. An induction motor's rotor can either be of the wound type or squirrel-cage type.

In wound-rotor motors, the rotor windings are connected through slip rings to external resistances. This is why this type of motor is also referred to as a slip ring motor. During startup, the external resistances reduce the field strength at the stator. As a result, the current in the stator winding is limited to the nominal current. When the motor reaches full speed, the rotor poles are switched to short circuit.

The slip rings are connected to the windings of the rotor by electric cables. The rotor has a hollow shaft comprising an open end. Electric cables connecting the rotor windings to the slip rings run through the hollow shaft.

It is known to fill up the space inside the hollow shaft which is not taken up by the electric cables with a resin, for example an epoxy resin. When curing inside the hollow shaft, the resin becomes hot, for example as hot as 180° C. The thermal expansion of the resin at this temperature is large. As the resin cools down, the resin contracts. This has been found to result in cracks inside the cured resin. Further, it has been discovered that the cured resin tends to lose contact with the inner circumference of the hollow shaft. This is again detrimental with regard to thermal conduction of heat from the electric cables. Eventually, this is considered a limiting factor in building slip ring motors with high power outputs. Also, when cracks form in the resin, sharp chips may result—especially when considering that the resin rotates along with the rotor at, for example, 1,500 to 1,800 rounds per minute which causes substantial centrifugal forces and vibrations to act on the resin. These chips may cut through the insulation material of the electric cables and thereby produce failure of the rotor. In another aspect, maintenance personnel may get hurt from the sharp chips when doing maintenance work on the rotor.

An object of the present invention is to provide an improved method for manufacturing a rotor for a slip ring motor, an improved rotor for a slip ring motor and an improved slip ring motor.

This object is achieved by a method for manufacturing a rotor for a slip ring motor comprising the steps of: a) arranging a plurality of electric cables inside a hollow shaft, wherein the electric cables are distributed over an inner circumference of the hollow shaft, b) filling a resin into an empty space defined by the hollow shaft and the electric cables, c) arranging a rod inside the hollow shaft, thereby displacing the resin into an annular gap between the rod and the hollow shaft, wherein the electric cables are arranged in the annular gap, and d) curing of the resin to form the rotor.

One concept on which the present invention is based consists of arranging a rod inside the hollow shaft, wherein the resin is provided merely in the annular gap between the rod and the hollow shaft. Thereby, the total volume of resin inside the hollow shaft is reduced. This again limits thermal expansion and contraction as the resin cures and cools down. Thus, cracks in the cured resin as well as the loss of surface contact between the cured resin and the inner circumference of the hollow shaft is prevented. As a result, this kind of rotor allows slip ring motors of higher power output to be built in the future.

It is emphasized at this point that no specific order is intended by using the numbering a) to d). Rather, the method steps a) to d) can have any order. For example, the rod may be arranged inside the hollow shaft prior to filling the resin into the hollow shaft. In this case, the resin is filled into the annular gap formed between the rod and the hollow shaft. Yet, it may be preferable to first fill the resin into the hollow shaft and then arrange a rod inside the hollow shaft. This is because the rod, when arranged inside the hollow shaft, tends to obstruct the flow of the resin and thus cavities may result.

According to an embodiment, prior to step b), spaces are arranged inside the hollow shaft, the spacers holding the electric cables to the inner circumference of the hollow shaft.

As a result, the electric cables will be arranged close to or touching the inner circumference of the hollow shaft, thereby improving heat transfer from the electric cables to the hollow shaft. Further, the spaces help to hold the electric cables in a defined location prior to filling the resin into the hollow shaft.

According to a further embodiment, the spacers each have an opening, the rod being pushed therethrough in step c).

Thus, the rod may extend through the hollow shaft along its entire length and, at the same time, the spacers may hold the electric cables to the inner circumference of the hollow shaft at any desired point along the length of the rod.

According to a further embodiment, the spacers have recesses on their outer circumference, each recess guiding one of the electric cables.

Preferably, each recess is shaped so as to correspond to the shape of an associated cable. In the assemble state, an open side of each recess is closed by the inner circumference of the hollow shaft, preferably.

According to a further embodiment, the spacers comprise at east three support portions and a recess portion between two of the support portions, respectively, wherein each support portion lies directly against the inner circumference of the hollow shaft and each of the recess portions has one or more of the recesses.

By having at least three support portions, the location of a respective spacer in the radial direction is defined. Herein, the "radial" direction refers to a direction at right angles to the axis of rotation of the rotor. Since the location of each spacer in the radial direction is defined, the location of the electric cables guided in recesses of a respective spacer is also defined. The at least three support portions are spaced apart in the circumferential direction (with respect to the rotor axis).

According to a further embodiment, the rod is made of a plastic material, in particular glass fiber composite.

Preferably, a lightweight material is chosen for the rod. This reduces the rotational mass of the rotor.

According to a further embodiment, the rod is configured to engage the spacers so as to prevent a movement of the spacers due to the filling of the resin in step b).

The filling of the resin into the hollow shaft may cause forces on the spacers to develop. For example, the viscosity of the resin as well as a buoyancy of the spacers in the resin may result in such forces.

According to a further embodiment, the rod comprises a plurality of shoulders, each configured to engage an associated spacer, a diameter of the rod decreasing in a stepwise fashion at each shoulder.

In this manner, the location of each spacer along the rod is defined.

According to a further embodiment, diameters of the openings in the associated spacers correspond to the rod diameter at a respective shoulder.

Using this design, the spacers may be lined up one after the other with decreasing diameters of the openings in the spacers in one direction. The rod is then pushed through the openings in the spacers in said direction. The shoulders on the rod engage an associated spacer.

According to a further embodiment, the hollow shaft is, prior to step b), arranged such that its central axis is oriented parallel to the direction of gravity, and the resin is filled to the hollow shaft from above.

This kind of setup ensures good filling of all cavities inside the hollow shaft with resin.

According to a further embodiment, if it is determined after step c) that the annular gap is not completely filled with resin, additional resin is filled into the annular gap to completely fill the annular gap.

Ideally, the amount of resin filled into the hollow shaft in step b) is selected such that, when the rod is arranged inside the hollow shaft in step c), thus displacing the resin into the annular gap, the level of resin in the annular gap rises just up to the top edge of the open end of the hollow shaft. At this point, the annular gap is completely filled with resin. However, in some cases it may be difficult to determine the required amount of resin exactly up front. Thus, it may be desirable to add the missing resin in a further step.

According to a further embodiment, the recesses in the spacers are formed as axial grooves and/or the opening in the spacers are formed as central holes.

"Axial" herein refers to a direction parallel to the axis of rotation of the rotor. "Central" refers to the holes in the spacers having a middle axis co-linear with the axis of rotation of the rotor.

According to a further embodiment, the resin is an epoxy resin.

Preferably, the resin cures at a temperature at, for example, 150 to 200° C.

Further, a rotor for a slip ring motor is provided. The rotor comprises a hollow shaft, a plurality of electric cables distributed over an inner circumference of the hollow shaft, a rod arranged inside the hollow shaft to form an annular gap between the rod and the hollow shaft, wherein the electric cables are arranged in the annular gap, and cured resin provided in the annular gap between the electric cables.

Even further, a slip ring motor with a power output>1 or >10 Megawatt (MW) comprising a rotor as described above is provided.

The embodiments and features described with reference to the method of the present invention apply mutatis mutandis to the rotor and the slip ring motor.

Herein, "perpendicularly" or "at right angles" preferably includes deviations of up to 20°, preferably up to 10° and more preferably up to 3° from a line being exactly perpendicular or at right angles.

"A" or "one" element is not to be understood as limited to only one element, but more than one element, for example two, three or more elements may be provided. By the same token, "two" or any other wording herein related to specific numbers is not to be understood as being limited to that number of elements only, but any other number of elements may be provided.

Further possible implementations or alterative solutions of the invention also encompass combinations—that are not explicitly mentioned herein—or features described above or below with regard to the embodiments. The person skilled in the art may also add individual or insulated aspects and features of the most basic form of the invention.

Further embodiments, features and advantages of the present invention will become apparent from the subsequent description and dependent claims, taking in conjunction with the accompanying drawings.

In the Figures, like reference numerals designate like or functionally equivalent elements, unless otherwise indicated.

FIG. 1 shows, in a partial section view, a slip ring motor 1 in accordance with an embodiment of the present invention.

Figure 1:
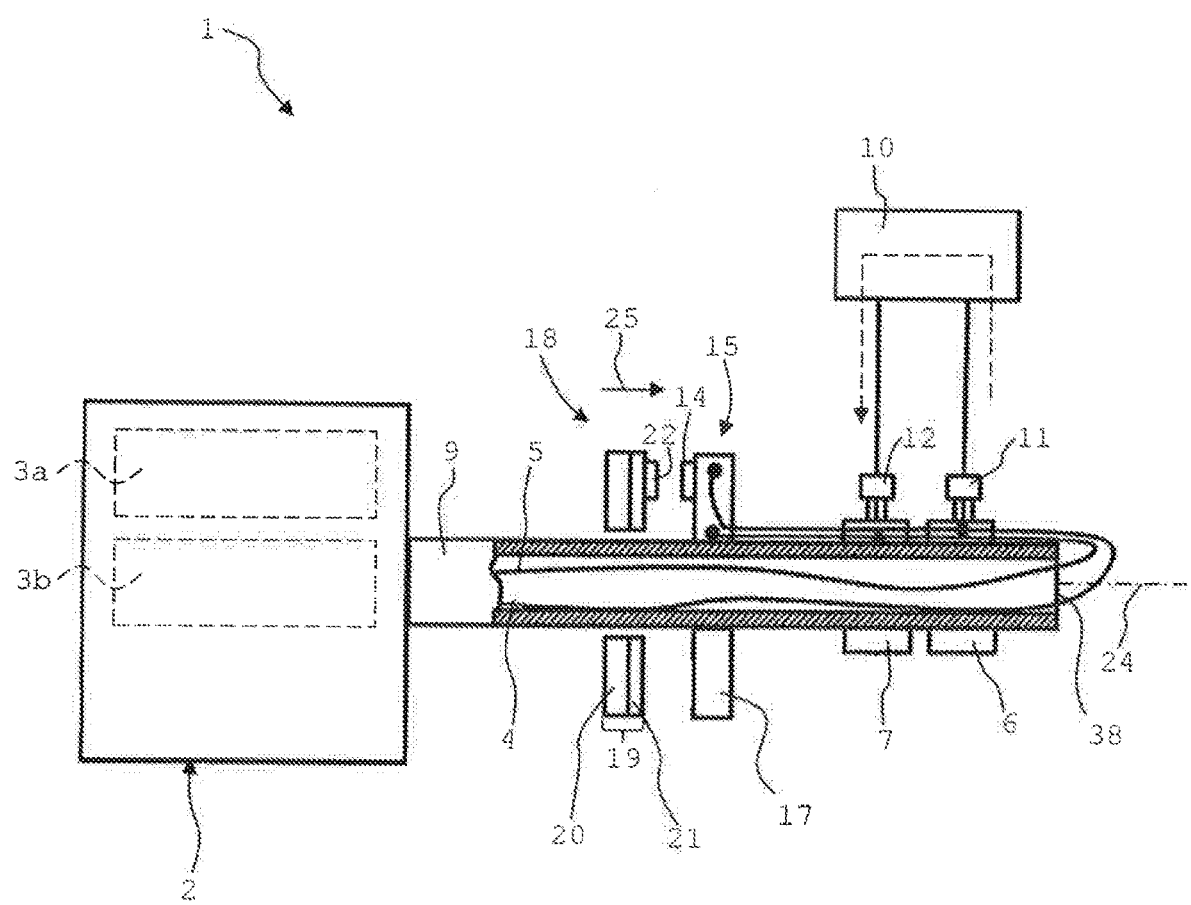
FIG. 1 shows, in a partial section view, a slip ring motor according to an embodiment.

The slip ring motor 1 drives a compressor (not shown) used in an air separation plant, for example. The slip ring motor 1 comprises a rotor 2 arranged inside a stator (not shown). The rotor 2 is of the wound type. The rotor 2 comprises multiple windings 3a, 3b. The windings 3a, 3b are connected by a first and a second electric cable 4, 5 to a first and a second slip ring 6, 7. In order to simplify representation, only two cables 4, 5 and two slip rings 6, 7 are shown in FIG. 1. Typically, six or more cables and corresponding slip rings are provided.

The cables 4, 5 are guided from the windings 3a, 3b to the slip rings 6, 7 inside a hollow shaft 9 (shown in partial section) of the rotor 2. The slip ring 6, 7 are rotationally fixed to the shaft 9 so as to rotate with the same. The slip ring 6, 7 are contacted by brushes 11, 12, respectively. The brushes 11, 12 are stationary and connected electrically to an external resistance 10.

The cable 4 is shown to be connected to the slip ring 6, and the cable 5 is connected to the slip ring 7. Further, the cable 4 is connected, preferably by a contact bolt (not shown), to a male contact element 14 of a first rotating unit 15 (see FIG. 3), and the cable 5 is connected, preferably by another contact bolt (not shown), to a male contact element 16 of the first rotating unit 15. Black dots in FIGS. 1 and 3 indicate points of electrical connection of the cables 4, 5 or contact bolts.

Figure 3:
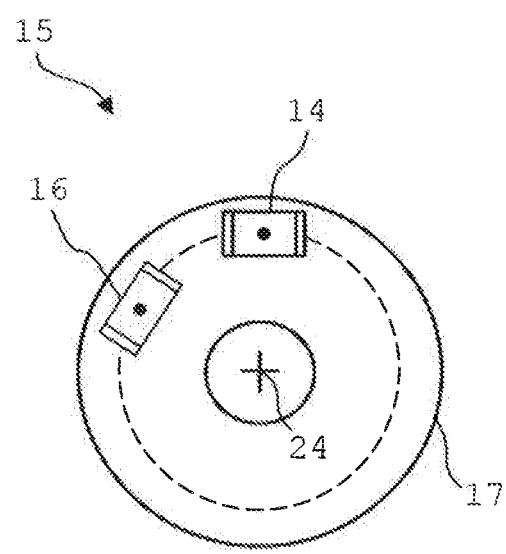
FIG. 3 show, in an axial view, a second ring unit from FIG. 1 comprising male contact elements.

The rotating unit 15 may comprise a ring 17 as seen in the axial view of FIG. 3. The ring 17 is made of a material electrically insulating the male contact elements 14, 16 against each other. For example, the ring 17 is made of glass fiber composite.

Figure 2:
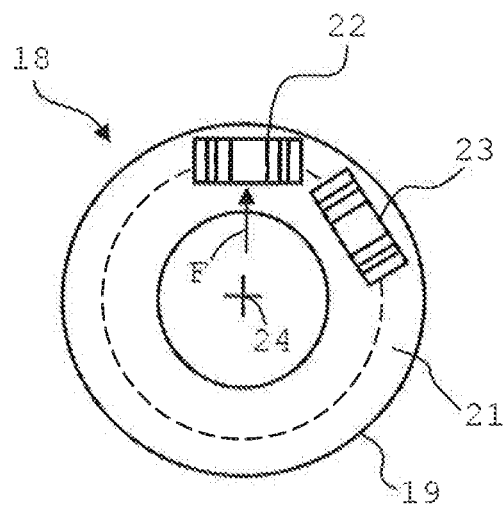
FIG. 2 shows, in an axial view, a first ring unit from FIG. 1 comprising female contact elements.

Further, the slip ring motor 1 comprises a second rotating unit 18 shown in an axial view in FIG. 2. The second rotating unit 18 comprises a ring 19. The ring 19 is made up of a base ring element 20 (see FIG. 1) and a conducting ring element 21. The base ring element 20 is configured as an electrical insulator, for example made of glass fiber composite. The conducting ring element 21 on the other hand is made of a conducting material, for example copper. Female contact elements 22, 23 (see FIG. 2) are attached to the conducting ring element 21, wherein electrical connection is made between the female contact elements 22, 23 and the conducting ring element 21.

Of course, the first rotating unit 15 may comprise more than two, for example six to twelve male contact elements, and the second rotating unit 18 may comprise more than two, for example six to twelve female contact elements, as indicated by the dotted lines in FIGS. 2 and 3. For illustration purposes, only two such elements are shown in FIGS. 2 and 3, respectively.

Both rotating units 15, 18 are attached to the shaft 9 so as to rotate with the same. Yet, the first rotating unit 15 is also fixed axially to the shaft 9, whereas the second rotating unit 18 is configured to be moved along the axis 24 on the hollow shaft 9.

FIG. 1 shows a first state in which the first and second rotating unit 15, 18 are spaced apart from each other such that the male and female contact elements 14, 16, 22, 23 are disengaged from one another. Thus, the cables 4, 5 and the corresponding windings 3*a*, 3*b* are not switched to short circuit. Consequently, the inrush current induced during startup of the slip ring motor 1 passes from the winding 3*a* through the cable 4, via the slip ring 6 and the brush 11 into the external resistance 10. The external resistance 10 may comprise an electrolyte or any other high-resistance material. After passing through the external resistance 10, the current returns to the winding 3*b* via the brush 12, the slip ring 7 and the cable 5. The path of the current through the external resistance 10 is indicated by a dashed arrow.

When the slip ring motor 1 has started up, i.e. as the rounds per minute of the rotor 2 increase, the current through the cables 4, 5 becomes smaller. Thus, it is desirable to switch off the external resistance 10 when the slip ring motor 1 has reached its nominal speed. To this end, the second rotation unit 18 is moved in a direction 25 along the axis 24 into a second state (not shown), in which the male contact elements 14, 16 engage the female contact elements 22, 23. Consequently, the cables 4, 5 are switched to short circuit since the current goes from the cable 4 through the male contact element 14 into the female contact element 22, through the conducting ring element 21 and via the female contact element 23 and the male contact element 16 into the cable 5.

Even though presently only explained with respect to a single phase and/or a single pair of windings 3*a*, 3*b*, the same principle holds for the other phases and/or other pairs of windings.

Figure 4:
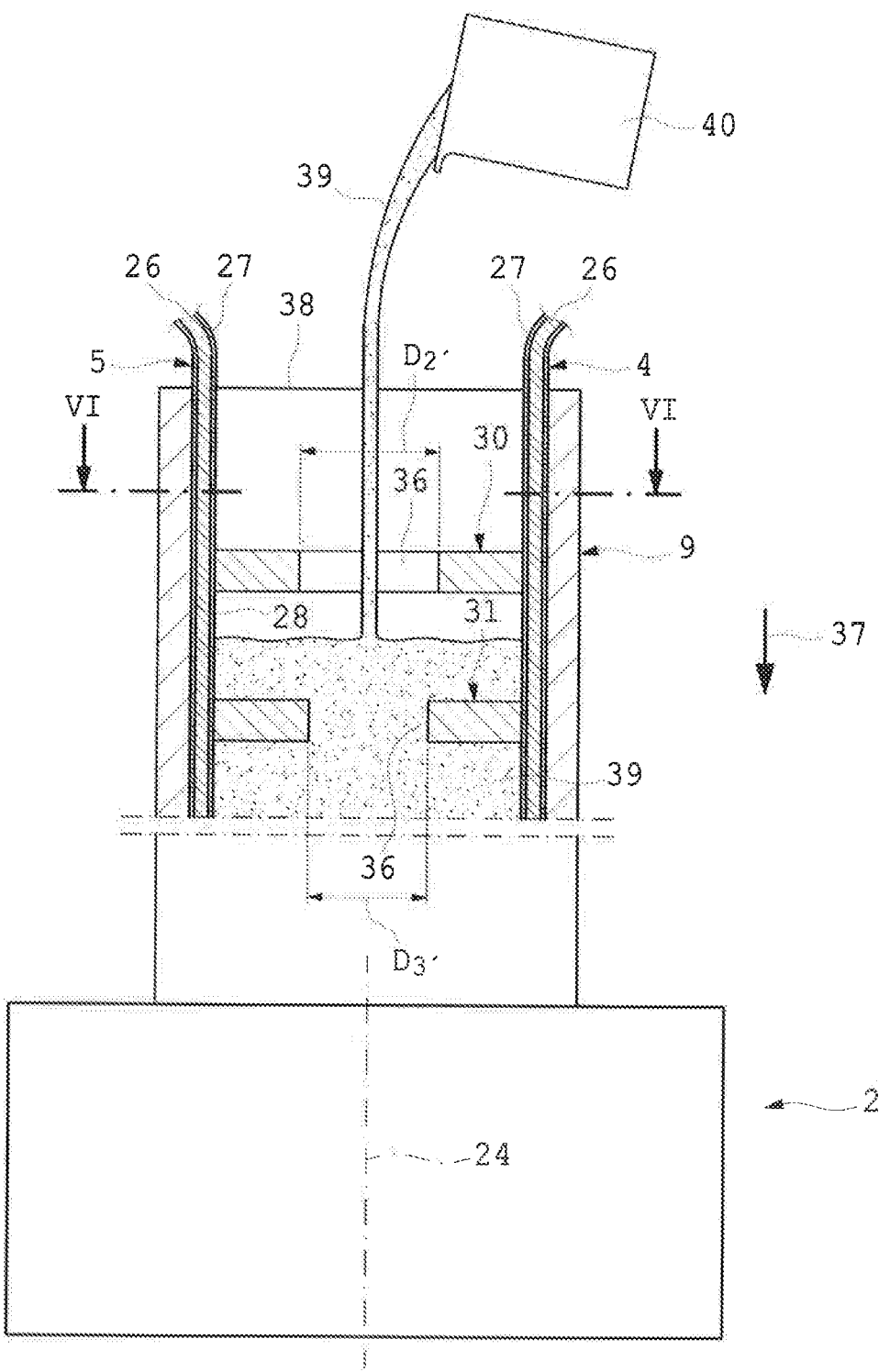
FIG. 4 shows, in a partial section view, a method step in accordance with an embodiment of a method for manufacturing a rotor of the slip ring motor of FIG. 1.

FIG. 4 shows, in a partial section view, a method step in the manufacture of the rotor 2 of FIG. 1 in accordance with an embodiment.

Prior to the method step shown in FIG. 4, the cables 4, 5 are arranged inside the hollow shaft 9. This may be done in a horizontal orientation of the rotor 2, i.e. when the axis of rotation 24 of the rotor 2 is oriented horizontally.

Figure 6:
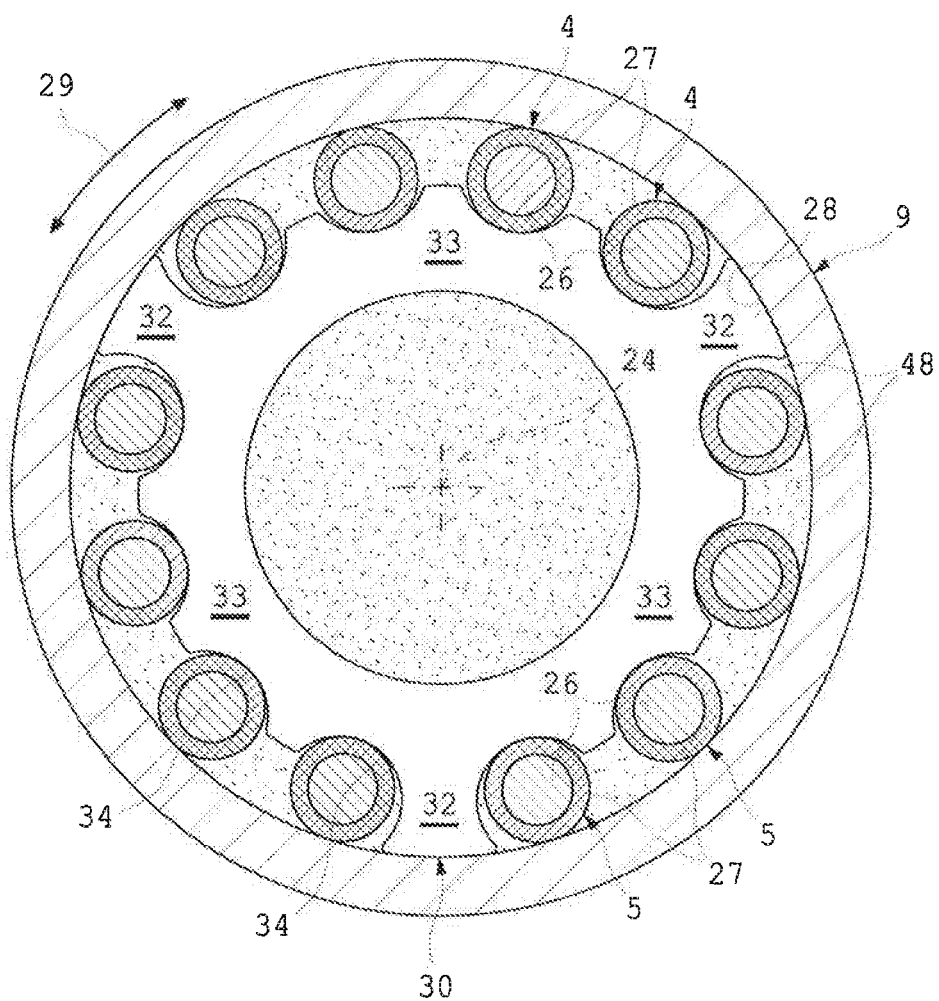
FIG. 6 shows a section view IV-IV from FIG. 4.

The cables 4, 5 may be arranged inside the hollow shaft 9 as illustrated in the section IV-IV shown in FIG. 6. Each of the cables 4, 5 (in order to simplify representation only a few cables have been given reference numerals) comprises a conductor 26, for example made of copper, enclosed by a sheath or insulator 27. The cables 4, 5, in particular the sheath or insulator, each touch the inner circumference 28 of the hollow shaft 9 or lie in close vicinity thereto. Close vicinity presently means a distance between the inner circumference 28 and the closest point on the outer surface of a respective cable 4, 5 being no larger than 5 mm, preferably no larger than 3 mm and more preferably no larger than 1 mm.

As can be seen from FIG. 6, the cables 4, 5 are distributed over the inner circumference 28 in the circumferential direction 29. "Circumferential" refers to the axis of rotation 24 herein.

Further, FIG. 6 shows a first spacer 30 holding the cables 4, 5 to the inner circumference 28. Preferably, the spacer 30 is introduced into the hollow shaft 9 along with the cables 4, 5 or after the cables 4, 5 have been arranged inside the hollow shaft 9. The spacer 30 may be introduced into the hollow shaft 9 in its horizontal position (see FIG. 1) or in its vertical position (see FIG. 4). In addition to the first spacer 30, a second spacer 31 shown in FIG. 4 and, as the case may be, additional spacers (not shown) may be arranged inside the hollow shaft 9.

Figure 5:
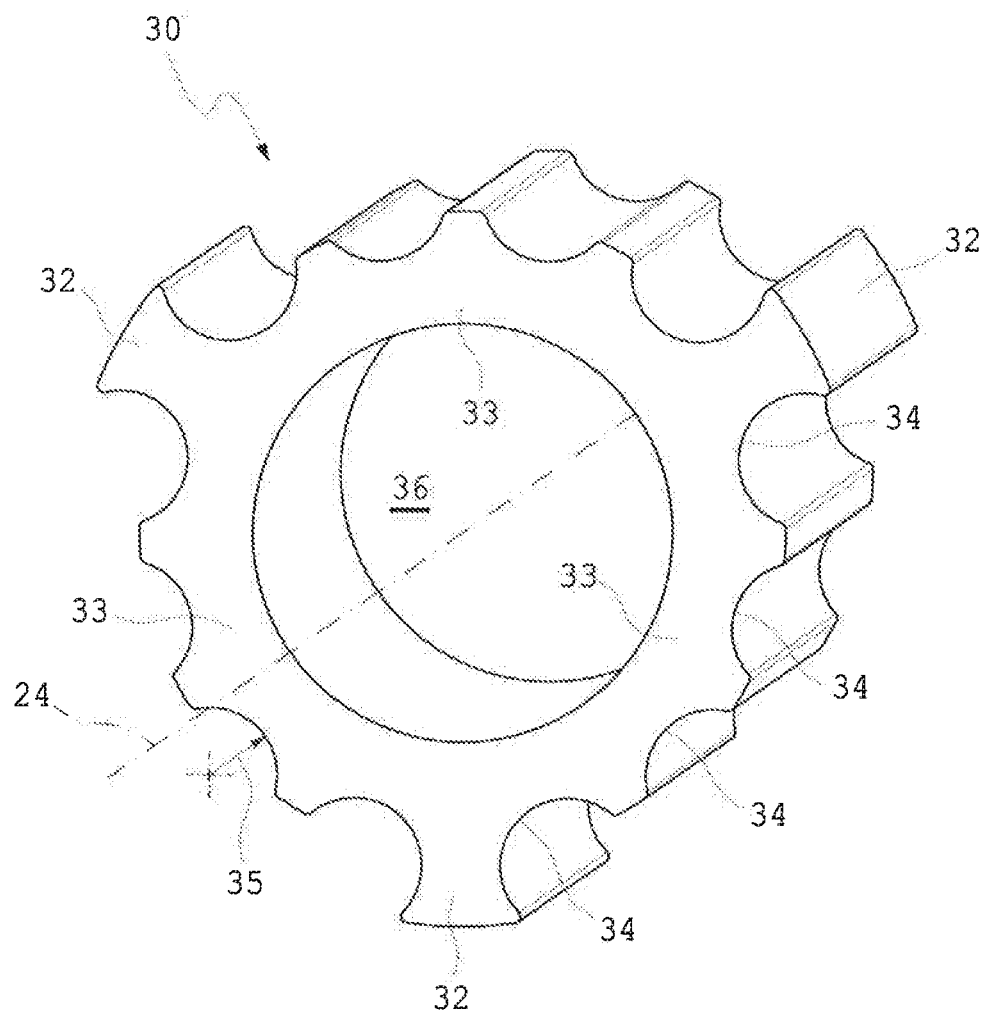
FIG. 5 shows, in a perspective view, a spacer used in the setup of FIG. 4.

The design of the first spacer 30 will be explained hereinafter in more detail referring to FIGS. 5 and 6. What is being explained herein with regard to the first spacer 30, equally applies to the second spacer 31 and the additional spacers.

The spacer 30 has a triangular shape comprising support portions 32 at a respective edge. Bent recess portions 33 are arranged between each pair of support portions 32. Each recess portion 33 corresponds to a third of a circle. On the outside, the recess portions 33 each comprise recesses 34 formed as axial grooves. The recesses 34 thus extend parallel to the axis of rotation 24. Each recess portion 33 may comprise, for example, two to six recesses 34. In the present example, each recess portion 33 has four recesses 34. Thus, the spacer 30 of the present example supports a total of 12 cables 4, 5 as can be seen in FIG. 6. Each recess 34 guides an associated cable 4, 5. A radius 35 describing each recess 34 corresponds to the radius of a respective cable 4, 5. On the inside, the recess portions 33 define a semicircular hole 36 extending through the spacer 30. A central axis of the holes 36 is coaxial with the axis of rotation 24 of the rotor 2.

Once the cables 4, 5 and, preferably, the spacers 30, 31 have been inserted into the hollow shaft 9, the rotor 2 is turned so as to be oriented vertically. That is, the axis of rotation 24 is oriented parallel to the gravity vector 37 shown in FIG. 4. In this position, an open end 38 of the hollow shaft 9 faces upwards. The turning of the rotor 2 may be done using overhead cranes or the like.

Now, liquid resin 39, for example, an epoxy resin, is filled into the hollow shaft 9, i.e. into the empty space defined by the hollow shaft 9, the cables 4, 5 and the spacers 30, 31. At this point, the resin 39 may be at a temperature of, for example, 50 to 150° C. The resin 39 is poured from above, for example using a container 40 supported by overhead cranes not shown), into the open end 38 of the hollow shaft 9. Especially the holes 36 in the spacers 30, 31 allow the resin 39 to flow downwards and thus fill the hollow shaft 9 from the bottom upwards with resin 39.

Figure 7:
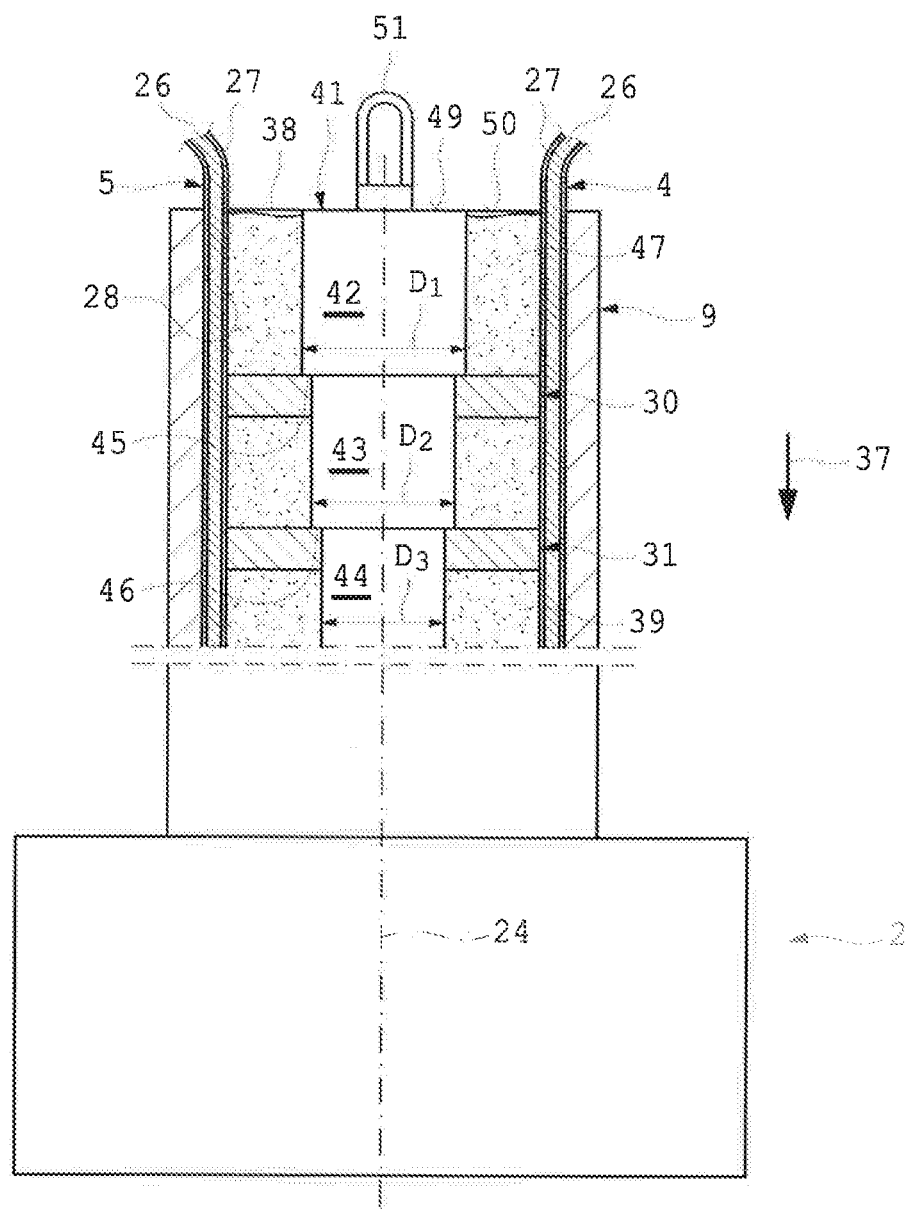
FIG. 7 shows the view of FIG. 4, yet with a rod inserted into a hollow shaft of the rotor.
Figure 8:
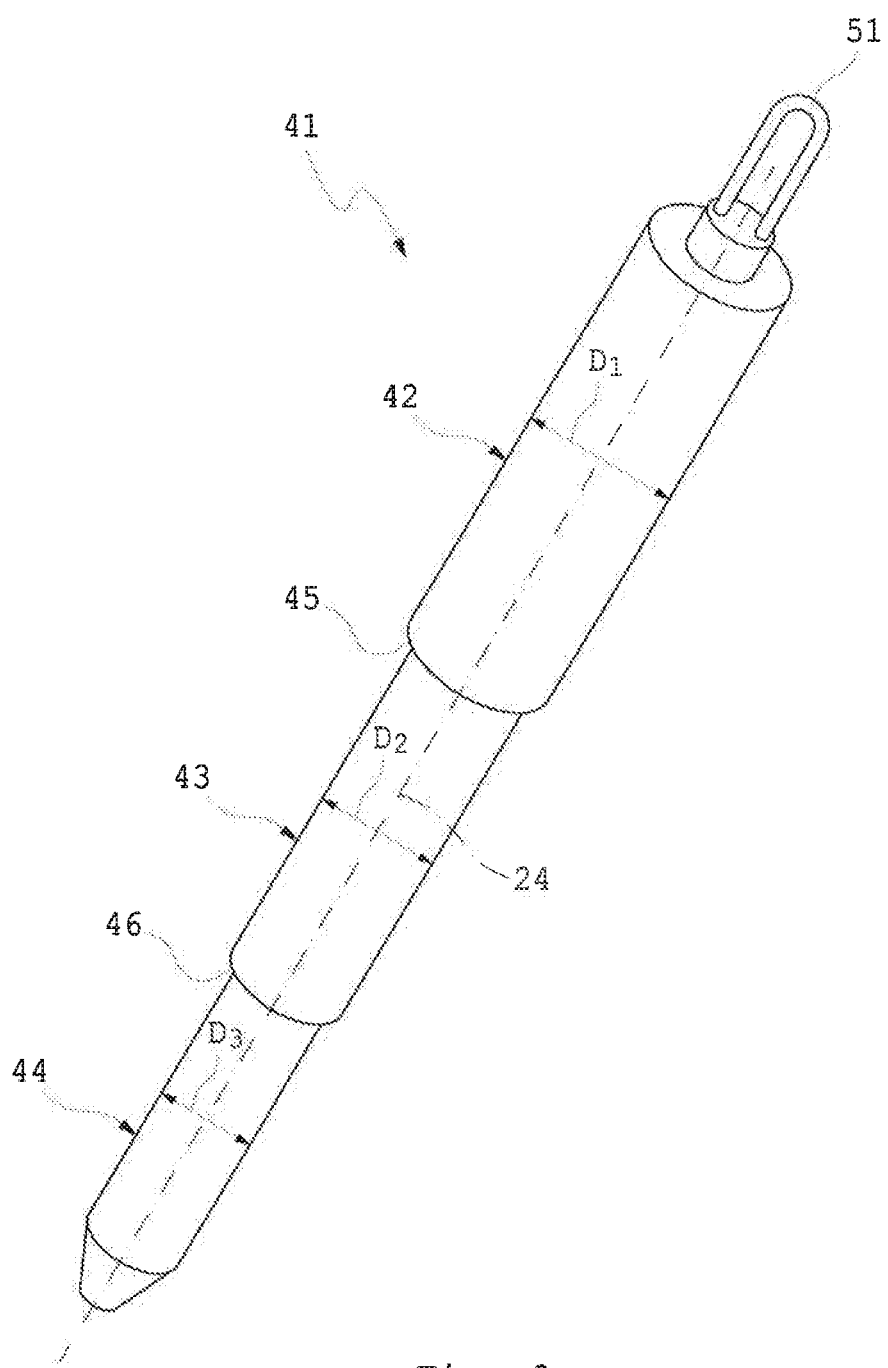
FIG. 8 shows, in a perspective view, the rod of FIG. 7.

Once, the hollow shaft 9 has been filled partially with resin 39, a rod 41 (depicted in FIGS. 7 and 8) is inserted into the hollow shaft 9 from above through the open side 38. The rod 41 is comprised of, for example, three portions of constant diameter, hereinafter referred to as a first portion 42, a second portion 43 and a third portion 44. The first portion 42 has a diameter $D_1$, the second portion 43 a diameter $D_2$ and the third portion 44 a diameter $D_3$. The diameter $D_1$ is larger than the diameter $D_2$, and the diameter $D_2$ is larger than the diameter $D_3$. Thus, shoulders 45, 46 are formed at each point where the diameter changes. The shoulders 45, 46 are configured to engage the spacers 30, 31. To this end, the hole 36 in the spacer 31 has a diameter $D_3'$ corresponding to the diameter $D_3$ of the third portion 44 of the rod 41. The hole 36 in the spacer 30 has a diameter $D_2'$ corresponding to the diameter $D_2$ of the second portion 43 of the rod 41. Thus, the shoulder 46 engages the spacer 31 in the axial direction, i.e. along the axis of rotation 24. At the same time, the shoulder 45 engages the spacer 30 in the axial direction. This engagement occurs when the rod 41 is pushed or lowered from above through the holes 36 in the spacers 30, 31.

As the rod 41 is pushed down or lowered in the direction of the gravity vector 37, the resin 39 is displaced sideways and upwards into an annular gap 47 thus formed between the rod 41 and the inner circumference 28 of the hollow shaft 9. At this point, cavities which may have remained, for example, cavities 48 (see FIG. 6 showing the resin 39 in the background) defined between the spacers 30, 31, the inner circumference 28 and the cables 4, 5, are filled. This is because of the pressure build-up inside the hollow shaft 9, when the rod 41 is pushed into the resin 39.

As the rod 41 is pushed into the resin 39 from above, a pressure develops that as explained above—not only fills the cavities 48, but also tends to raise the spacers 30, 31 upwards. By now engaging the spacers 30, 31 with the shoulders 45, 46, the rod 41 prevents such raising of the spacers 30, 31.

Preferably, the amount of resin 39 in the hollow shaft 9 is selected such that, when the rod 41 has been inserted completely into the hollow shaft 9, i.e. a top surface 49 of the third portion 42 is flush with the open end 38 of the hollow shaft 9, the resin 39 has risen inside the annular gap 47 to a level 50 flush with the open end 38.

In cases where the amount of resin 39 cannot be determined up front with the necessary accuracy, less resin 39 can be filled into the hollow shaft 9 initially. In a further step, missing resin in the annular gap 47 is filled into the hollow shaft 9 when the rod 41 has been inserted completely.

Yet, according to another embodiment, the rod 41 is first inserted into the hollow shaft 9, and thereafter the resin 39 is filled into the annular gap 47.

The rod 41 may comprise a lug 51 which allows easy handling of the rod 41, for example using an overhead crane. This is especially advantageous since the rod 41 needs to be lifted from the ground to a position above the open end 38 of the hollow shaft 9. The portions 42, 43, 44 of the rod 41 may be made of glass fiber composite, for example.

Once the hollow shaft 9 is completely filled, the resin 39 is cured. During curing of the resin 39, temperatures for example as high as 180° C. or more may occur. Since the amount of resin 39 in the annular gap 47 is reduced due to the presence of the rod 41, thermal expansion and contraction during heating and cooling of the resin 39 is kept to a minimum. Once the resin 39 has fully cured, the rotor 2 is obtained and may be assembled with further components to form the slip ring motor 1.

Although the present invention has been described in accordance with preferred embodiments, it is obvious for the skilled person in the art that modifications are possible in all embodiments.

LIST OF REFERENCE NUMERALS 1 slip ring motor
2 rotor
3a, 3b windings
4 cable
5 cable
6 slip ring
7 slip ring
9 shaft
10 external resistance
11 brush
12 brush
14 male contact element
15 rotating unit
16 male contact element
17 ring
18 rotating unit
19 ring
20 base ring element
21 conducting ring element
22 female contact element
23 female contact element
24 axis
25 direction
26 conductor
27 sheath
28 inner circumference
29 circumferential direction
30 spacer
31 spacer
32 support portion
33 recess portion
34 recess
35 radius
36 hole
37 gravity vector
38 open end
39 resin
40 container
41 rod
42 portion
43 portion
44 portion
45 shoulder
46 shoulder
47 annular gap
48 cavity
49 top surface
50 level
51 lug

The invention claimed is:

1. A method for manufacturing a rotor for a slip ring motor, said method comprising:
    a) arranging a plurality of electric cables inside a hollow shaft, wherein the electric cables are distributed over an inner circumference of the hollow shaft,
    b) filling a resin into an empty space defined between the hollow shaft and the electric cables,
    c) arranging a rod inside the hollow shaft thereby displacing the resin into an annular gap between the rod and the hollow shaft, wherein the electric cables are arranged in the annular gap, and
    d) curing the resin to form the rotor.

2. The method of claim 1, wherein, prior to b), spacers are arranged inside the hollow shaft, the spacers holding the cables to the inner circumference of the hollow shaft.

3. The method of claim 2, wherein each of said spacers has an opening through which said rod is pushed in c).

4. The method of claim 2, wherein each of said spacers has a recess on its outer circumference, each recess guiding one of the electric cables.

5. The method of claim 4, wherein each of said spacers comprises at least three support portions and a recess portion between two of the support portions, respectively, wherein each of the support portions lies directly against the inner circumference of the hollow shaft and each of the recess portions has one or more of the recesses.

6. The method of claim 5, wherein said at least three support portions are spaced apart in the circumferential direction with respect to the rotor axis.

7. The method of claim 4, wherein each of said spacers has an opening through which said rod is pushed in c), and wherein the recesses in the spacers are formed as axial grooves and the openings in the spacers are formed as central holes.

8. The method of claim 2, wherein the rod is configured to engage the spacers so as to prevent movement of the spacers due to the filling of the resin in b).

9. The method of claim 8, wherein the rod comprises a plurality of shoulders, each shoulder being configured to engage an associated spacer, and wherein a diameter of the rod decreases in a stepwise fashion at each shoulder along the rod's length.

10. The method of claim 9, wherein each of said spacers has an opening through which said rod is pushed in c), and wherein the diameters of the openings in the associated spacers correspond to the rod diameter at a respective shoulder.

11. The method of claim 2, wherein said spacers have a triangular shape comprising support portions at each edge of the triangular shape and bent recess portions arranged between each pair of support portions.

12. The method of claim 2, wherein the hollow shaft has a central axis, and the hollow shaft is, prior to b), arranged such that its central axis is oriented parallel to the direction of gravity, and the resin is filled into the hollow shaft from above in b).

13. The method of claim 1, wherein the rod is made of plastic material.

14. The method of claim 1, wherein the rod is made of a glass fiber composite.

15. The method of claim 1, wherein the hollow shaft has a central axis, and the hollow shaft is, prior to b), arranged such that its central axis is oriented parallel to the direction of gravity, and the resin is filled into the hollow shaft from above in b).

16. The method of claim 1, wherein, if after c) the annular gap is not completely filled with resin, additional resin is filled into the annular gap prior to d) to completely fill the annular gap.

17. The method of claim 1, wherein the resin is an epoxy resin.

18. The method according to claim 1, wherein each of said cables comprises a conductor enclosed by a sheath or insulator, wherein the sheath or insulator touches the inner circumference of the hollow shaft or the sheath or insulator is positioned such that the distance between the inner circumference of the hollow shaft and the closest point on the outer surface of each cable is no larger than 5 mm.

19. The method of claim 1, wherein said cables are distributed over the inner circumference of the hollow shaft in the circumferential direction with respect to the rotor axis.

* * * * *